Oct. 11, 1949.  W. M. HENSHAW  2,484,223
FISHING ROD HANDLE
Filed May 22, 1945
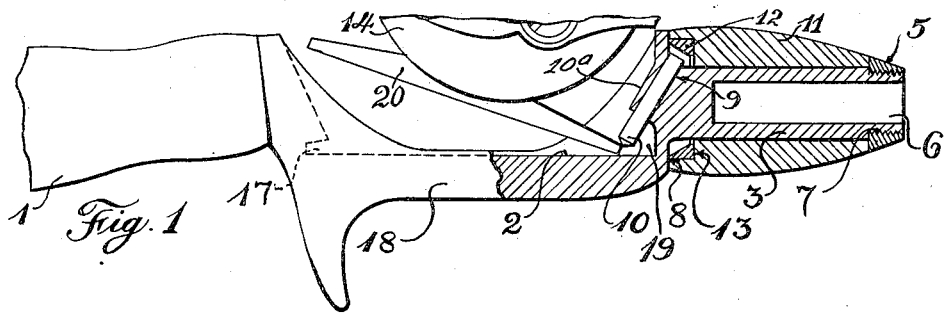
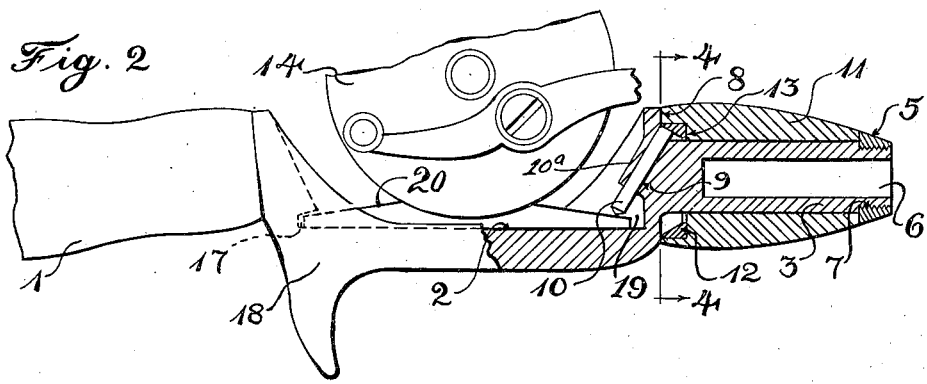
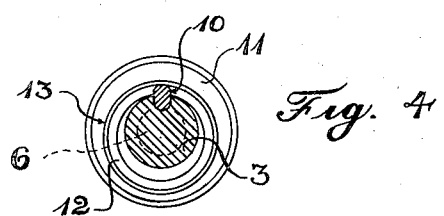
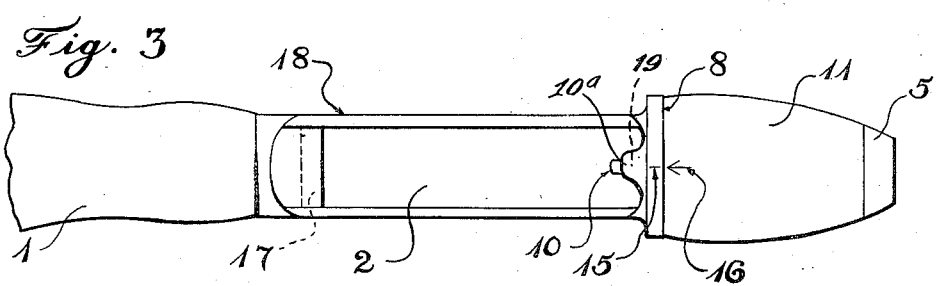
INVENTOR
William Miller Henshaw
BY
Pennie, Edmonds, Morton & Barrows
ATTORNEYS Patented Oct. 11, 1949

2,484,223

UNITED STATES PATENT OFFICE 2,484,223

FISHING ROD HANDLE

William Miller Henshaw, London, Ontario, Canada

Application May 22, 1945, Serial No. 595,156 In Canada March 6, 1944

Section 1, Public Law 690, August 8, 1946 Patent expires February 15, 1964

5 Claims. (Cl. 43—22)

This invention relates to a drop-saddle handle for a fishing rod so designed that it is smaller and lighter than any handles heretofore in use and incorporates a mechanism to lock a fishing reel into the handle which is entirely new and has not been used before.

There have been in use handles of the same general design so far as the drop-saddle device is concerned, but there has been no handle which incorporates a lock for the reel which does not require both hands to operate when inserting the reel. All handles in use require a drop-saddle longer than the reel-saddle thereby increasing the size and length of the handle and adding to its weight. Another disadvantage of the existing reel locks are that they are so designed that the pressure to hold the reel in position is exerted by a sleeve action which tends to jam or seize upon the reel-saddle and very often can only be disengaged by hammering or prying with another tool and not by the mechanism of the inventor.

My invention constitutes a device where there are two slots in the drop-saddle into which both ends of the reel-saddle fit, thereby shortening the handle saddle, together with a lock which is an integral part of the forepart of the dropsaddle. The advantage is that the handle can be held in one hand, the lock loosened with the other hand, the reel then inserted by the same hand and the lock engaged. The device can be unlocked and the reel disengaged with the same simplicity. The mechanism is such that it cannot jam or seize upon the reel-saddle.

In describing the invention references will be made to the attached drawings in which Figure 1 is a broken side view partly in vertical section showing the improved fishing rod handle mechanism in unlocked position with a fishing reel being inserted.

Figure 2 is a view similar to that of Figure 1 showing the reel in locked position in the handle.

Figure 3 is a view looking down on the fishing rod handle shown in Figures 1 and 2 with the reel removed.

Figure 4 is a vertical sectional view taken on the line 4—4 of Figure 2 looking in the direction of the arrows.

The fishing rod handle as shown in the drawings is in the general form of a drop-saddle handle having a handle grip 1 and a drop-saddle section 18, the latter including a reel seat 2 and a trigger grip as shown. The handle is made of metal preferably a light metal such as aluminum, or strong plastic. In order to make the handle as light as possible the portion to the rear of the saddle is fitted with a covering of moulded wood, cork or like substance. In the bottom of the drop-saddle are two slots 17 and 19 into which the ends of the reel-saddle 20 fit. The slot 19 is formed by a projection 18a which extends from the forepart of the drop-saddle 18 over a portion of the reel seat 2.

From the fore part of the drop-saddle projects a standard 3, which in my sample is 1½ inches long, but may be any desired length or diameter depending upon the size of the rod to be used. The base of the standard is solid and moulded into the fore part of the drop-saddle 18. The upper portion of the standard is hollow at 6 to receive the rod. The end of the standard is threaded about ¼ of an inch, at 7, and has a diameter slightly less than the standard, thus establishing a shoulder.

At the front end of the drop-saddle and at the base of the standard a hole 9, is bored from top to bottom through the projection 18a at an angle so that the top is partly in the saddle and partly in the standard, and the bottom aperture is in the upper surface of slot 19, that is, in the lower portion of the projection 18a.

Into the hole 9 is fitted a locking pin 10 which is sufficiently less in diameter than the hole to allow the locking pin to move freely in it so that it cannot jam or seize. The locking pin is of such a length that when the reel is put in position in the slots 17 and 19, and the eccentric sleeve, 11, is rotated to the locking position the locking pin will press firmly against the reel-saddle 20 of a reel 14. The locking pin is made of a hard, non-corrosive metal such as brass, for long wear and to avoid jamming and seizing.

A protector ring, 12, fits over the standard and is of an inner diameter sufficiently larger than the standard so that when the device is unlocked the locking pin can move freely up and down in the hole, thereby relieving the pressure on the reel-saddle. The ring is bevelled on its inside surface, the larger diameter of the bevel being toward the base of the standard and the angle of the bevel being such that it engages the whole upper end surface of the locking pin at right angles to its axis. The ring is made of a hard, long-wearing, non-corrosive metal or substance such as brass to avoid jamming and seizing.

The eccentric sleeve 11 fits over the standard 3 and has an inner diameter to enable it to slip easily over the standard. The inner end portion of the eccentric sleeve is recessed to provide a circular shouldered groove 13, to accommodate the protector ring fitting loosely so that when the protector ring is in place on the standard the eccentric sleeve completely covers it and fits closely to the front surface 8 of the drop-saddle. The eccentric sleeve is of such length that it reaches almost to the shoulder of the threaded end 7. The eccentric recess 13 is off-set from the axis of the eccentric sleeve at least $\frac{1}{32}$ of an inch, but varying according to the size of the lock. The eccentric sleeve may be made wholly of metal but in the interest of lightness it is desirable to make the core of light hard metal such as aluminum and to fit over this a cover of wood, plastic or other light material. By reducing the size of the recess 13 in the eccentric sleeve and beveling it the protector ring could be eliminated. But this would necessitate the use of a hard, non-corrosive metal or substance in its construction. Best results have been obtained by the use of the protector ring which furthermore gives an additional bearing surface.

When the locking pin, protector ring and eccentric sleeve are in position on the standard, the whole are held in position by a retainer nut, 5, which screws onto the threaded portion 7 tightly against the shoulder but leaving the eccentric sleeve free to rotate easily.

My lock is operated in the following manner: The eccentric sleeve 11 is rotated so that the locking pin 10 moves freely up and down in the hole 9, which is indicated when the arrow 16 in Figure 3 is opposite the line 15 on the fore part of the drop-saddle 18. In this position the offset circumference of the eccentric recess 13 is uppermost. The front lip of the reel-saddle 20 is then inserted under the pin 10 and moved forward into the slot 19, it being easily pushed in under the loose pin. The reel is then moved back so that the rear part of the reel-saddle engages in slot 17, Figure 2. The eccentric sleeve 11 is then rotated in either direction until the locking pin is forced down firmly against the front lip of the reel-saddle 20. The reel is thus locked firmly into the drop-saddle at front and rear. In this position the inset circumference of the eccentric sleeve has moved upward sufficiently to exert a pressure on the ring 12, thence upon the locking pin 10 forcing the latter down upon the reel-saddle. To release the lock the eccentric sleeve is rotated in the opposite direction to that in which it was rotated on locking until the locking pin is loose and resting only by its own weight upon the reel-saddle when the reel-saddle can be pushed back into slot 19 and disengaged from slot 17 and removed. In the operation of the eccentric sleeve, the ring, and the locking pin cannot jam or seize in any position.

I claim:

1. In a fishing rod handle having a seat for a reel saddle and means forming front and back slots at opposite ends of the seat, said slots opening toward each other and adapted to receive the front and back lips respectively of a reel saddle, means for locking a reel saddle on the seat including a pin movable upwardly and downwardly in a hole in the front slot-forming means, the hole opening down into the forward slot so that the pin is adapted to engage the front lip of the reel saddle, and means on the forward portion of the handle separate from the pin for forcing said pin into locking position in engagement with the forward lip of a reel saddle on the seat, said last mentioned means being movable into a position permitting free up and down movement of the pin.

2. A locking device for a fishing rod handle, comprising a pin mounted in the handle in a position so that one end is adapted to engage a lip of a reel saddle mounted on the handle, and a rotatable eccentric member mounted on the handle adjacent said pin and adapted to engage the opposite end of the pin, said member upon rotation being adapted to press said pin into locking engagement with the tip of a reel saddle mounted on the handle.

3. A locking device for a fishing rod handle, comprising a pin mounted in the handle in a position so that one end is adapted to engage a lip of a reel saddle to hold the saddle in position on the handle, a sleeve mounted on the handle adjacent said pin and for rotation on its axis, and a ring eccentric with respect to said axis carried by the end of said sleeve adjacent said pin and in a position to engage the opposite end of said pin, said sleeve upon rotation being adapted to change the position of said ring eccentrically and thereby press said pin into locking engagement with the lip of a reel saddle seated on the handle.

4. A locking device as defined by claim 3 in which the end of said sleeve adjacent the pin is provided with an eccentric groove in which said ring is mounted, and said ring being rotatable freely in said groove.

5. In a fishing rod handle having a seat for a reel saddle, means at one end of said seat projecting over a lip of a reel saddle when in position on said seat, a pin mounted for free endwise movement in said projecting means and extending from the seat at an angle inclined away from the seat, the handle including a cylindrical portion extending beyond said pin mounting, a member fitting said cylindrical portion and rotatable thereon, a flange on said rotatable member extending over and adapted to engage the outer end of said pin, said flange being eccentric with respect to said cylindrical member, whereby said pin is forced toward said reel seat upon rotation of said cylindrical member.

WILLIAM MILLER HENSHAW.

REFERENCES CITED

The following references are of record in the file of this patent:

UNITED STATES PATENTS

| Number | Name | Date |
| --- | --- | --- |
| 2,010,627 | Dileo | Aug. 6, 1925 |
| 2,020,869 | Bassett | Nov. 12, 1935 |
| 2,219,474 | Dempsey | Oct. 29, 1940 |